United States Patent [19]

Ishikawa et al.

[11] Patent Number: 5,858,902
[45] Date of Patent: Jan. 12, 1999

[54] SEMICONDUCTING CERAMIC COMPOUNDS HAVING NEGATIVE RESISTANCE-TEMPERATURE CHARACTERISTICS WITH CRITICAL TEMPERATURES

[75] Inventors: Terunobu Ishikawa, Shiga-ken; Akinori Nakayama; Hiroshi Takagi, both of Otsu, all of Japan

[73] Assignee: Murata Manufacturing Co., Ltd., Kyoto, Japan

[21] Appl. No.: 831,722

[22] Filed: Apr. 1, 1997

[30] Foreign Application Priority Data

Apr. 1, 1996 [JP] Japan .................................. 8-078950

[51] Int. Cl.[6] .................................................. C04B 35/50
[52] U.S. Cl. ............................ 501/152; 501/126; 252/521
[58] Field of Search .................................... 501/126, 152; 252/519, 521

[56] References Cited

U.S. PATENT DOCUMENTS

5,302,559  4/1994  Mateika et al. .......................... 501/152
5,703,000  12/1997  Nakayama et al. ..................... 501/152

FOREIGN PATENT DOCUMENTS

0609888A1  2/1994  European Pat. Off. .

*Primary Examiner*—Deborah Jones
*Attorney, Agent, or Firm*—Ostrolenk, Faber, Gerb & Soffen, LLP

[57] ABSTRACT

A semiconducting ceramic having negative resistance-temperature characteristics and a critical temperature consisting essentially of a rare-earth transition element oxide which is an oxide of a combination of samarium and nickel, wherein the samarium is partially replaced with Ln which is at least one other element selected from the group consisting of bismuth and rare-earth elements excluding lanthanum and cerium.

17 Claims, 1 Drawing Sheet

● $GdNiO_3$

■ $GdSmNi_2O_6$

◆ $SmNiO_3$

▲ $SmNdNi_2O_6$

× $NdNiO_3$

• GdNiO$_3$

■ GdSmNi$_2$O$_6$

♦ SmNiO$_3$

▲ SmNdNi$_2$O$_6$

× NdNiO$_3$

SEMICONDUCTING CERAMIC COMPOUNDS HAVING NEGATIVE RESISTANCE-TEMPERATURE CHARACTERISTICS WITH CRITICAL TEMPERATURES

BACKGROUND OF THE INVENTION

1. Technical Field of the Invention

The present invention relates to semiconducting ceramic compounds which have negative resistance-temperature characteristics with critical temperatures.

2. Description of the Related Art

Negative temperature coefficient semiconducting ceramics (hereinafter referred to as NTC ceramics) whose electrical resistance is high at room temperature and drops with temperature increase are known in the prior art. Examples of materials for producing such NTC ceramics are oxides of transition elements which have a spinel crystalline structure and mainly contain a few elements selected from aluminum, manganese, iron, nickel, cobalt and copper, as well as cobalt-containing rare-earth oxides which have a perovskite crystalline structure and mainly contain $LaCoO_3$.

NTC ceramic devices produced by forming electrodes on each piece of an NTC ceramic material consisting essentially of the oxides of some of the aforementioned transition elements are used as rush current preventing devices for switching regulators or for the protection of motors or halogen lamps, or as temperature-sensitive devices for temperature sensing or for detecting the surface of a liquid, for instance. On the other hand, NTC ceramic devices produced by forming electrodes on each piece of an NTC ceramic material consisting essentially of a cobalt-containing rare-earth oxide are commonly used as rush current preventing devices for switching regulators or for the protection of motors or halogen lamps, for instance.

Also known in the prior art are critical temperature resistor semiconducting ceramics (hereinafter referred to as CTR ceramics) whose electrical resistance sharply drops beyond specific temperatures. Examples of materials for producing such CTR ceramics are vanadium dioxide ($VO_2$) and nickel-containing rare-earth oxides, the latter including $SmNiO_3$, $NdNiO_3$, $PrNiO_3$ and $EuNiO_3$, for instance.

CTR ceramic devices produced by forming electrodes on each piece of a CTR ceramic material consisting essentially of $VO_2$ are used as temperature-sensing devices for fire-alarm systems.

Although the aforementioned NTC ceramics composed essentially of the oxides of some of the transition elements and the NTC ceramics consisting essentially of the cobalt-containing rare-earth oxides have negative resistance-temperature characteristics, neither of them exhibit critical temperatures at which their resistance sharply drops. It has therefore been necessary to use the conventional NTC ceramic devices together with a controlling microcomputer circuit when applying them to on-off switching operations, and this has resulted in large component sizes and high costs of materials.

While the CTR ceramics consisting essentially of $VO_2$ have the characteristic that their resistivity drops from $10^4$ ohm-centimeters to 10 ohm-centimeters in a temperature range of 60° C. to 80° C., they are not in a stable phase at room temperature. This develops a problem in that these CTR ceramics can be destroyed when brought into contact the air or moisture. Furthermore, since their critical temperatures are restricted within the range of 60° C. to 80° C., their applications are limited to temperature-sensing devices for fire-alarm systems.

The resistance of the CTR ceramics consisting essentially of the aforementioned nickel-containing rare-earth oxides sharply drops beyond specific temperatures (metal-to-semiconductor phase transition temperatures) as discussed in a paper presented by J. B. Torrance, et al. (FIGS. 1 and 2 on page 8,210 of Physical Review B45 [14], 1990) Such characteristics of the CTR ceramics, particularly $SmNiO_3$, $NdNiO_3$ and $PrNiO_3$, are also discussed in a paper presented by P. Lacorre, et al. (FIG. 4 on page 225 of Solid State Chemistry, 1991)

Although these papers give resistance values of different samples in ohms at about their phase transition temperatures, neither of them indicates specific shapes of the samples. It is therefore impossible to know their resistivities or conductivities, especially at room temperature (25° C.), from these papers. The inventors of the present invention analyzed the crystalline structures of the same samples using the X-ray diffraction method and succeeded in identifying $NdNiO_3$ and $PrNiO_3$ in the samples. An analysis of the sample containing $SmNiO_3$ revealed a diffraction pattern seemingly produced by $SmNiO_3$, but there was found a diffraction pattern of NiO as well. Therefore, it was impossible to determine that the CTR characteristics of that sample were caused by $SmNiO_3$ alone.

Substituting lanthanum (La) for 30% of neodymium (Nd) contained in $NdNiO_3$ reduces its phase transition temperature from −70° C. to −170° C. as discussed in a paper presented by J. B. Garcia-Munoz, et al. (FIG. 1 on page 15,198 of Physical Review B5 [21], 1995) However, it is not certain whether the phase transition temperature can be altered by substituting a rare-earth element rather than lanthanum (La) for the neodymium (Nd).

SUMMARY OF THE INVENTION

It is an object of the invention to provide semiconducting ceramic compounds having negative resistance-temperature characteristics, wherein their resistivity sharply drops beyond specific critical temperatures and such temperatures can be freely set to a desired level.

According to an important aspect of the invention, a semiconducting ceramic compound has negative resistance-temperature characteristics with a critical temperature and consists essentially of a rare-earth transition element oxide which is an oxide of a combination of Ln and nickel (LnNi), wherein Ln is one or more elements selected from the group including bismuth and rare-earth elements but excluding lanthanum and cerium.

In another aspect of the invention, the oxide of LnNi is an oxide of a combination of samarium and nickel (SmNi).

In still another aspect of the invention, the oxide of SmNi consists essentially of $SmNiO_3$.

In a further aspect of the invention, the samarium contained in $SmNiO_3$ is partially replaced by at least one element selected from praseodymium, neodymium, europium, gadolinium, yttrium, dysprosium and bismuth.

The aforementioned semiconducting ceramic compound of the invention is suited for use in a rush current preventing device, a soft-start control device for a motor and a temperature-sensing device.

The semiconducting ceramic compound of the invention consisting essentially of the oxide of LnNi has negative resistance-temperature characteristics wherein the resistivity of the compound is large below a phase transition temperature and sharply drops beyond that phase transition (or critical) temperature. This semiconducting ceramic compound exhibits a large difference in electrical resistance between its energized and non-energized conditions.

The semiconducting ceramic compound consisting essentially of the oxide of $SmNiO_3$ exhibits negative resistance-temperature characteristics with its resistance sharply decreasing in a temperature range between 100° C. and 140° C. Accordingly, a device constructed with this semiconducting ceramic compound can be used with least influence of environmental and operating conditions.

The semiconducting ceramic compound of the invention having negative resistance-temperature characteristics with a critical temperature and consisting essentially of the oxide of LnNi can be used to produce rush current preventing devices for switching regulators or for the protection of motors or halogen lamps, soft-start control devices for motors, or temperature-sensitive devices for temperature sensing, liquid surface detection, overheat prevention or for fire-alarm systems.

The semiconducting ceramic compound of the invention having negative resistance-temperature characteristics with a critical temperature and consisting essentially of the oxide of $SmNiO_3$ can be used for producing rush current preventing devices, soft-start control devices for motors or for the protection of halogen lamps. Furthermore, the phase transition temperature can be set to a desired value by completely or partially replacing samarium contained in $SmNiO_3$ with neodymium or gadolinium, making the compound even more suited to liquid surface detection and temperature-sensing applications.

DETAILED DESCRIPTION OF THE INVENTION

FIRST EMBODIMENT

Figure 1:
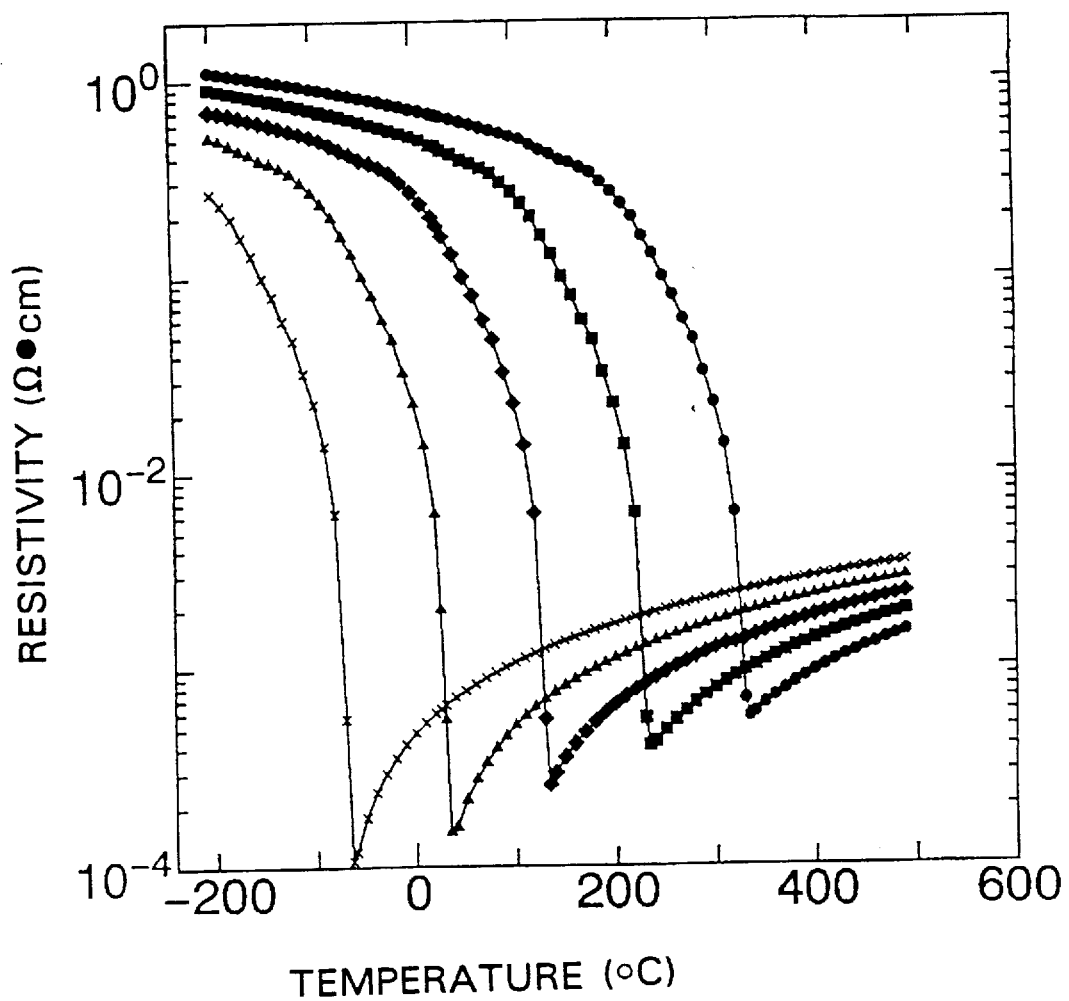
FIG. 1 is a graph showing resistance-temperature characteristics of semiconducting ceramic devices according to first and second embodiments of the invention.

A powdered compound containing nickel (Ni), such as $Ni_3O_3$, NiO or Ni(OH), a powdered compound containing samarium (Sm), such as $Sm_2O_3$ or $Sm(OH)_3$, and a powdered compound containing neodymium (Nd), such as $Nd_2O_3$ or $Nd(OH)_3$, were weighed and mixed so that the molar ratio of the sum of samarium and neodymium to nickel ((Sm+Nd)/Ni) becomes 0.98, and thereby the chemical formula $(Sm_{1-x}Nd_x)_{0.98}NiO_3$ is satisfied after a later sintering process. This mixture was blended and pulverized in a ball mill through a 24-hour wet milling process, mixed with a binder, and further blended in the ball mill for another one hour. The resultant compound was filtered, dried, and press-molded at a pressure of 2 t/cm². This semifinished molded product was sintered in oxygen at a temperature of 900° C. for a period of two hours to eliminate the binder, and then in a hot isostatic pressing (HIP) furnace containing oxygen which was maintained at a temperature of 1000° C. and a pressure of 2000 bars for a period of four hours to eventually obtain a disklike sintered product measuring 9 mm in diameter and 3 mm in thickness. External electrodes composed of silver were formed on both sides of this sintered product by a vacuum evaporation method to complete a semiconducting ceramic device.

The samples of semiconducting ceramic devices thus obtained were subjected to various measurements to evaluate their characteristics. More specifically, temperatures (Tc) at which the temperature coefficient of resistance changes from a negative value to a positive value, temperature-dependent changes in resistance ($\psi$), and resistivities ($\rho$) at different temperatures were measured, and measurement results are shown in Table 1. Since the temperature at which the temperature coefficient of resistance of each sample begins to sharply drop is difficult to identify, its temperature-dependent change in resistance ($\psi$) is expressed by the following formula:

$$\psi = \log_{10} \{R(Tc-50)/R(Tc)\}$$

TABLE 1

| Amount of substitution X | Tc (°C.) | $\psi$ | $\rho$ (Tc) ($\Omega$cm) | $\rho$ (25° C.) ($\Omega$cm) |
|---|---|---|---|---|
| 0.0 | 134 | 2.04 | 0.00026 | 0.18 |
| 0.1 | 114 | 2.14 | 0.00022 | 0.12 |
| 0.2 | 94 | 2.20 | 0.00019 | 0.070 |
| 0.3 | 74 | 2.22 | 0.00018 | 0.042 |
| 0.4 | 54 | 2.26 | 0.00017 | 0.019 |
| 0.5 | 34 | 2.31 | 0.00015 | 0.020 |
| 0.6 | 14 | 2.31 | 0.00014 | 0.00019 |
| 0.7 | −4 | 2.40 | 0.00010 | 0.00024 |
| 0.8 | −24 | 2.37 | 0.00012 | 0.00038 |
| 0.9 | −44 | 2.40 | 0.00012 | 0.00052 |
| 1.0 | −62 | 2.44 | 0.00011 | 0.00063 |

SECOND EMBODIMENT

A powdered compound containing nickel (Ni), such as $Ni_3O_3$, NiO or Ni(OH), a powdered compound containing samarium (Sm), such as $Sm_2O_3$ or $Sm(OH)_3$, and a powdered compound containing gadolinium (Gd), such as $Gd_2O_3$ or $Gd(OH)_3$, were weighed and mixed so that the molar ratio of the sum of samarium and gadolinium to nickel ((Sm+Gd)/Ni) becomes 0.98, and thereby the chemical formula $(Sm_{1-y}Gd_y)_{0.98}NiO_3$ is satisfied after a later sintering process. Several samples of semiconducting ceramic devices were obtained from this mixture using the same production method as used in the first embodiment.

These semiconducting ceramic devices were subjected to various measurements to evaluate their characteristics in the same manner as the first embodiment, and measurement results are shown in Table 2.

TABLE 2

| Amount of substitution Y | Tc (°C.) | $\psi$ | $\rho$ (Tc) ($\Omega$cm) | $\rho$ (25° C.) ($\Omega$cm) |
|---|---|---|---|---|
| 0.0 | 134 | 2.04 | 0.00026 | 0.18 |
| 0.1 | 154 | 2.04 | 0.00028 | 0.25 |
| 0.2 | 174 | 2.00 | 0.00031 | 0.32 |
| 0.3 | 194 | 1.95 | 0.00035 | 0.37 |
| 0.4 | 214 | 1.92 | 0.00038 | 0.41 |
| 0.5 | 234 | 1.89 | 0.00041 | 0.46 |
| 0.6 | 254 | 1.85 | 0.00045 | 0.51 |
| 0.7 | 274 | 1.82 | 0.00048 | 0.55 |
| 0.8 | 294 | 1.79 | 0.00051 | 0.59 |
| 0.9 | 314 | 1.79 | 0.00051 | 0.63 |
| 1.0 | 334 | 1.74 | 0.00057 | 0.67 |

FIG. 1 is a graph showing resistance-temperature characteristics of the semiconducting ceramic devices obtained in the first and second embodiments described above. It can be seen from this Figure that nickel-containing rare-earth oxides of the embodiments exhibit negative resistance-temperature characteristics with critical temperatures.

The aforementioned semiconducting ceramic materials $(Sm_{1-x}Nd_x)_{0.98}NiO_3$ and $(Sm_{1-y}Gd_y)_{0.98}NiO_3$ exhibit negative temperature coefficients below their phase transition temperatures and positive temperature coefficients beyond their phase transition temperatures. With these nickel-containing rare-earth oxides (composed of rare-earth elements and $NiO_3$) it is possible to obtain a desired phase transition temperature by choosing a proper mixing ratio of the individual rare-earth elements.

In particular, $Sm_{0.98}NiO_3$ and those ceramic materials which are produced by partially substituting neodymium (Nd) for samarium (Sm) contained in the $Sm_{0.98}NiO_3$ exhibit far superior characteristics compared to the conventionally known ceramic materials, when used in rush current preventing devices, soft-start control devices for motors, or temperature-sensing devices. The rush current preventing effect of $Sm_{0.98}NiO_3$, for example, does not decrease very much even when on-off switching operations are repeated because its resistance varies by a factor of over 100 between 100° C. and 140° C.

Since $Sm_{0.98}NiO_3$ has a B constant of 1400K at 25° C., which is lower than that of conventional thermistors used for preventing rush current, it is possible to reduce variations of the rush current preventing effect caused by temperature changes in equipment between −50° C. and 50° C.

Moreover, a device formed from $Sm_{0.98}NiO_3$ may be kept in air without sealing because the material is stable even at room temperature.

The molar ratio of the sum of rare-earth elements to nickel is not limited to 0.98, but may take other values chosen between about 0.80 and 1.05 preferably about 0.95–1. Also, the molar ratio of samarium to nickel is not limited to 0.98, but may be set to 1.00, for example, and may be, for instance, about 0.9–1.1, preferably about 0.95–1.

If it is desired to reduce the phase transition temperature of $SmNiO_3$, the samarium contained in it can be completely or partially replaced not only with neodymium but also with praseodymium (Pr) or lanthanum (La). On the contrary, if it is desired to increase its phase transition temperature, samarium contained in it can be completely or partially replaced not only with gadolinium but also with europium (Eu), gadolinium (Gd), terbium (Tb), dysprosium (Dy), holmium (Ho), erbium (Er), thulium (Tm), ytterbium (Yb), lutetium (Lu), yttrium (Y) and bismuth (Bi). It is to be noted, however, that the technique of partial substitution by lanthanum is known in the prior art but the product has not been known as suitable for critical temperature devices.

Although the semiconducting ceramic materials of the foregoing embodiments were obtained by sintering in a HIP furnace, such ceramic products may be obtained by using a single crystal growth process, or a thick-film or thin-film forming process instead of the sintering process. Furthermore, the HIP furnace is not absolutely necessary for the production of those semiconducting ceramic materials. Alternative techniques usable for their production include such synthesis methods as the hydrothermal synthesis method, sol-gel method, atomized thermal decomposition method, and chemical vapor deposition (CVD) method. The sintering atmosphere may be filled with ozone, or an oxidizer, such as hydrogen peroxide, may be added to raw materials when they are mixed so that the oxygen content of the sintering atmosphere becomes excessive.

While the invention has been described with reference to the disklike semiconducting ceramic devices in foregoing embodiments, the invention is not necessarily limited to that shape of devices but may be applied to other types and forms of semiconducting ceramic devices, which include multi-layered devices, cylindrical-shaped devices, and square-chip devices, for example. According to the aforementioned embodiments, the electrodes of the semiconducting ceramic devices were formed on their external surfaces. In a modified form of the invention, electrodes may be formed inside each of the semiconducting ceramic devices.

Although the electrodes were formed from silver in the aforementioned embodiments, other electrode materials, such as palladium, platinum, nickel, copper, chromium, an alloy containing silver and an alloy thereof, can be used without changing electrical characteristics of the individual devices. Furthermore, the electrode-forming method is not limited to vacuum evaporation. Other methods usable for producing the electrodes include thin-film technology such as sputtering, electroless plating, and thick-film forming techniques such as plating and printing.

What is claimed is:

1. A semiconducting ceramic having negative resistance-temperature characteristics and a critical temperature consisting essentially of a rare-earth transition element oxide which is an oxide of a combination of samarium and nickel, wherein the samarium is partially replaced with Ln which is at least one other element selected from the group consisting of bismuth and rare-earth elements excluding lanthanum and cerium.

2. The semiconducting ceramic as defined in claim 1, wherein the samarium in the oxide is partially replaced with at least one element selected from the group consisting of praseodymium and neodymium.

3. The semiconducting ceramic as defined in claim 1, wherein the samarium in the oxide is partially replaced with at least one element selected from the group consisting of europium, gadolinium, terbium, dysprosium, holmium, erbium, thulium, ytterbium, lutetium, yttrium and bismuth.

4. The semiconducting ceramic as defined in claim 1 which is $(Sm_{1-a}A_a)_bNiO_3$ wherein A is Nd or Gd, a is greater than 0 to about 1 and b is about 0.8–1.05.

5. The semiconducting ceramic as defined in claim 4, wherein a is about 0.1–0.9 and b is about 0.95–1.

6. The electrical device as defined in claim 4 in which the semiconducting ceramic having negative resistance-temperature characteristics and a critical temperature is $(Sm_{1-x}La_x)_bNiO_3$ wherein a is about 0 to 1 and b is about 0.8–1.05.

7. An electrical device selected from the group consisting of rush current preventing device, soft-start control device and temperature-sensing device, and which comprising a semiconductor ceramic having negative resistance-temperature characteristics and a critical temperature consisting essentially of a rare-earth transition element oxide which is an oxide of a combination of Ln and nickel (LnNi), wherein Ln is at least one element selected from the group consisting of bismuth and rare-earth elements excluding cerium.

8. A rush current preventing device comprising the semiconductor ceramic as defined in claim 1.

9. A rush current preventing device comprising the semiconductor ceramic as defined in claim 4.

10. A soft-start control device for a motor comprising the semiconducting ceramic compound as defined in claim 1.

11. A soft-start control device for a motor comprising the semiconducting ceramic compound as defined in claim 6.

12. A temperature-sensing device comprising the semiconducting ceramic compound as defined in claim 1.

13. A temperature-sensing device comprising the semiconducting ceramic compound as defined in claim 4.

14. A semiconducting ceramic having negative resistance-temperature characteristics and a critical temperature of the formula $Sm_{0.98}NiO_3$.

15. A rush current preventing device comprising the semiconductor ceramic as defined in claim 14.

16. A soft-start control device for a motor comprising the semiconducting ceramic compound as defined in claim 14.

17. A temperature-sensing device comprising the semiconducting ceramic compound as defined in claim 14.

* * * * *